United States Patent
Walance et al.

(10) Patent No.: US 6,466,649 B1
(45) Date of Patent: Oct. 15, 2002

(54) DETECTION OF BRIDGED TAPS BY FREQUENCY DOMAIN REFLECTOMETRY

(75) Inventors: Robert B. Walance, Newbury Park; Wayne K. Wong, Camarillo, both of CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/456,681

(22) Filed: Dec. 9, 1999

(51) Int. Cl.[7] .......................... H04M 1/24; H04M 3/08; H04M 3/22
(52) U.S. Cl. .................. 379/22.03; 379/22; 379/22.01; 379/22.02; 379/24
(58) Field of Search .............................. 379/1.01, 1.03, 379/1.04, 15.03, 22.01, 22.02, 22.03, 22.04, 24, 27.01, 27.03

(56) References Cited

U.S. PATENT DOCUMENTS

| | | |
|---|---|---|
| 3,870,838 A | 3/1975 | Corwin et al. ...... 179/175.31 R |
| 4,630,228 A | 12/1986 | Tarczy-Hornoch et al. . 364/756 |
| 4,812,738 A | 3/1989 | Itaya et al. .................... 324/58 |
| 5,404,388 A * | 4/1995 | Eu |
| 5,881,130 A * | 3/1999 | Zhang |
| 6,144,721 A * | 11/2000 | Stephens |

* cited by examiner

*Primary Examiner*—Duc Nguyen
(74) *Attorney, Agent, or Firm*—Allen, Dyer, Doppelt, Milbrath & Gilchrist, P.A.

(57) ABSTRACT

A test system automatically locates impedance mismatched, energy reflection discontinuities (e.g., bridged taps) along a wireline communication link, by coupling a linearly stepped sinusoidal waveform to a measurement location of the wireline link. The applied waveform propagates down the link and is reflected back from the energy reflection discontinuities. A line monitoring receiver coupled to the measurement location samples the response of the line to the swept waveform. A response processor executes a frequency domain reflectometry algorithm to analyze the frequency response of the wireline to the stepped frequency waveform. It then generates an output representative of distances from the measurement location to the bridged taps.

23 Claims, 3 Drawing Sheets

DETECTION OF BRIDGED TAPS BY FREQUENCY DOMAIN REFLECTOMETRY

FIELD OF THE INVENTION

The present invention is directed to communication systems, and is particularly directed to a system for automatically locating and thereby facilitating removal of energy reflection anomalies, such as bridged taps, and the like, that may impair digital communications along a wireline telecommunication link.

BACKGROUND OF THE INVENTION

In the face of the increasing demand for a variety of to digital communication services (such as, but not limited to internet services), telecommunication service providers are continually seeking ways to optimize the bandwidth and digital signal transport distance of their very substantial existing copper plant, that was originally installed for the purpose of carrying nothing more than conventional analog (plain old telephone service or POTS) signals.

In addition to the inherent bandwidth limitations of the (twisted pair) copper wire medium, service providers must deal with the fact that in-place metallic cable plants, such as that shown at 10 in the reduced complexity network diagram of FIG. 1, linking a central office 12 with a subscriber site 14, typically contain one or more anomalies, such as but not limited to load coils (used to enhance the wireline's three to four kilohertz voice response), and bridged taps 16, to which unterminated (and therefore reflective) lateral twisted pairs 18 of varying lengths may be connected.

Because these discontinuities cause a portion of the energy propagating along the wireline link to be reflected back in the direction of the source, at the high frequencies used for digital data communications (e.g., on the order of one MHz), such reflections can cause a significant reduction in signal amplitude, when (counterphase) combined with the original signal, thereby disrupting digital data service. In order to locate these reflection points, it has been conventional practice to employ interactive, time domain reflectometry (TDR), which relies upon the ability of a skilled technician to make a visual interpretation of a displayed TDR waveform, and thereby hopefully identify the bridged taps, and the lengths of any laterals that may extend therefrom. Because this process is subjective, it is not only imprecise, but is very difficult to automate.

SUMMARY OF THE INVENTION

In accordance with the present invention, shortcomings of conventional TDR-based schemes for locating energy reflecting anomalies, such as bridged taps and the like, along a wireline telecommunication link, are effectively obviated by means of an objective, frequency domain reflectometry (FDR)-based mechanism. The test mechanism of the invention may be implemented in a processor-controlled test head installed in a central office, or as part of test signal generation and processing circuitry of a portable craftsperson's test set.

The test head contains test signal generation and processing circuitry, that is operative to execute a frequency domain reflectometry (FDR) algorithm, through which the line is stimulated by means of a linearly swept (stepped) sinusoidal waveform, to invoke a line response that is readily measured and analyzed to reveal the locations (distance from the source) of any impedance mismatch reflection discontinuities (e.g., bridged taps and the like).

A control processor is programmed to generate a sinusoidal waveform that is linearly stepped from a minimum frequency of 0 Hz (DC) to a maximum frequency $f_{max}$. As the frequency of the test waveform applied to the line is swept, the signal level at a line access point is monitored via an input amplifier, digitized, and then and stored in a signal measurement buffer. The amplitude of the measured signal response will exhibit a variation with frequency that is a composite of fluctuations in impedance due to any reflection points (e.g., bridged taps) along the line.

Once captured, the response data is weighted to optimize the accuracy of the analysis. Any DC level is removed, and a window, such as a Hanning window, is used to remove discontinuities between start and end values of the captured data set, to avoid spurious results. A loss compensation function is applied to the modified data set, to compensate the frequency response characteristic of the line for loss over distance and frequency. A frequency-dependent propagation constant is derived in terms of the resistance, inductance, capacitance and conductance of the line per unit length. The real part of the propagation constant is the attenuation along the line per unit length. The attenuation of the envelope of a signal propagating along the line is an exponential function of the propagation constant. The effect on the frequency response waveform is that amplitude decay is less pronounced for reflected signals propagating on shorter loops, since the shorter distance offsets the effects of the loss at high frequencies. Because the length of the line under test is unknown, a compromise between the two extremes provides compensation for the overall frequency response waveform irrespective of distance.

The loss-compensated data is then processed by a frequency analysis operator, such as discrete Fourier transform (DFT), which decomposes the composite line signal response into frequency bins associated with the individual reflectors' frequency fluctuations. A threshold is established for the contents of the frequency bin data produced by the DFT, in order to distinguish between useful or significant energy and spurious energy. A frequency bin is considered to contain significant energy, if its contents exceed the threshold for that bin number. Any frequency bin whose contents exceed its threshold are subjected to frequency domain reflectometry (FDR) analysis.

In the context of detecting bridge taps along a wireline telecommunication link, a waveform propagating downstream along the wireline combines with a waveform reflected from a bridged tap and returning upstream along that wireline. Since the downstream and upstream propagating waveform components have the same frequency, the composite waveform will have a local minimum due to destructive interference at some time delay when the arguments of the two waveform components differ by $\pi$ radians. Nulls will occur for other frequencies, where the arguments of the waveform components differ by odd multiples of $\pi$. A linear sweep of a wireline having a single reflection point (e.g., bridged tap) will produce nulls at frequencies $f_o$, $3f_o$, $5f_o$, $7f_o$, etc. In general, the null repetition rate in the frequency domain $F_n$ may be given by: $F_n=1/2f_n$, where $f_n$ is the lowest frequency at which a null occurs when the delay $t=t_n$. $F_o$ corresponds to $t_o$ and, in general, $F_n$ corresponds to $t_n$ and is the same as the round-trip delay of the signal from the line access location to the point of reflection along the line and back.

In order to determine the length of time required for the waveform to propagate to the impedance-mismatch reflection point, it may be observed that to is representative of the total time required for the downstream propagating waveform to be reflected back to the access location at which the measurement is taken. This one-way delay $t_i$ is equal to $t_o$. To determine the distance of this reflection point from the access location, the propagation velocity $v_p$ of the waveform along the wireline, which is readily calculated, is employed. The distance from the access location to the location of the impedance mismatch reflection is inversely proportional to frequency, and the minimum resolvable distance $D_{min}=v_p/2f_{max}$.

Where the line under test contains plural discontinuities, the response waveform seen at the signal measurement point will contain multiple components produced by the plurality of reflection points. Since these reflected waveforms components are generally associated with impedance discontinuities caused by physical characteristics in the wireline separated by varying distances from the source, the delays associated with these reflections will be mutually different, so that their frequencies will be mutually different. As each delay produces its own unique frequency, then by identifying the various frequencies, the two-way delay times of a reflection from a wireline discontinuity may be readily determined, so that the distance to the impedance discontinuity may be determined.

To determine the individual values of two-way delay time, the frequency response waveform produced by stimulating the wireline under test with a linearly swept sinusoidal waveform is sampled at discrete frequency steps of ($f_{max}/N$). The DFT produced will yield values that area proportional to the magnitudes of the various null repetition rates $F_k$. The contents of the first frequency bin are the DC component of the swept response, while a respective bin m contains the magnitude of the null repetition rate $(m-1)F_o$, for $m=2,3,4,\ldots N/2$. Namely, the various energy bins of the response represent energy associated with the time delays $t_o$, $2t_o$, $3t_o$, etc., and contain the magnitude of the waveforms delayed by $(m-1)t_o$ for $m=2,3,4,\ldots N/2$.

As a result, the bins of the DFT, which represent different round trip delay times of the swept waveform, can be employed to determine the distances from the access location to energy-reflecting anomalies. The distance to a reflection point may be determined by multiplying the one-way delay by the velocity of propagation of the swept waveform. In general, the bins of the response represent distances that are integral multiples of the delay $t_o$. Namely, the distance $D_{m-1}$ associated with a bin m−1 is equal to $(m-1)t_o v_p/2$ or $[(m-1)t_o]v_p/2$ for $m=2,3,4,\ldots N/2$. Thus, there is a one-to-one correspondence between the bins of DFT and distances to the reflection points along the wireline.

DETAILED DESCRIPTION

Figure 1:
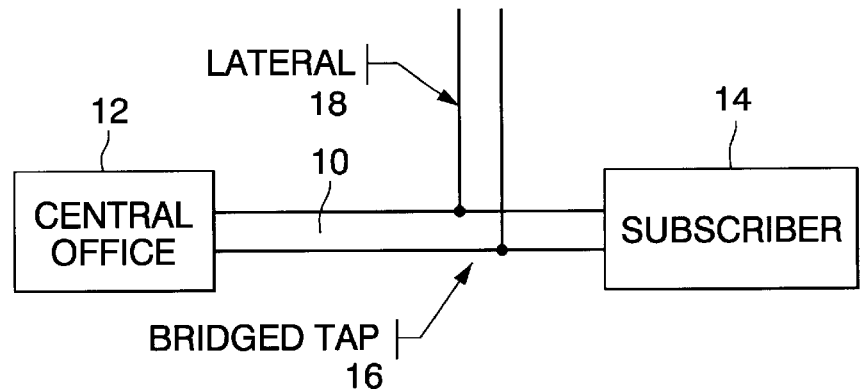
FIG. 1 is a reduced complexity network diagram showing an unterminated lateral twisted pair extending from a bridged tap installed in a wireline communication link between a central office and a subscriber circuit.

Before detailing the automated (FDR)-based energy reflection location mechanism of the present invention, it should be observed that the invention resides primarily in an arrangement of conventional communication hardware components and attendant supervisory communications microprocessor circuitry and application software therefor, that controls the operations of such components and analysis of signal waveforms interfaced therewith. In a practical implementation that facilitates their incorporation into telecommunication link test equipment (such as that which may be installed at a central office or resident in a portable test device), the inventive arrangement may be readily implemented using a general purpose digital computer, or field programmable gate array (FPGA)-configured, application specific integrated circuit (ASIC) chip sets. In terms of a practical hardware implementation of such chip sets, digital ASICs are preferred.

Consequently, the configuration of such components and the manner in which they may be interfaced with a (copper) wireline communication link have, for the most part, been illustrated in the drawings by readily understandable block diagrams and flow charts, which show only those specific details that are pertinent to the present invention, so as not to obscure the disclosure with details which will be readily apparent to those skilled in the art having the benefit of the description herein. Thus, the block diagram and flow chart illustrations of the Figures are primarily intended to show the major components and functional modules of the system of the invention in convenient functional groupings, whereby the present invention may be more readily understood.

Figure 2:
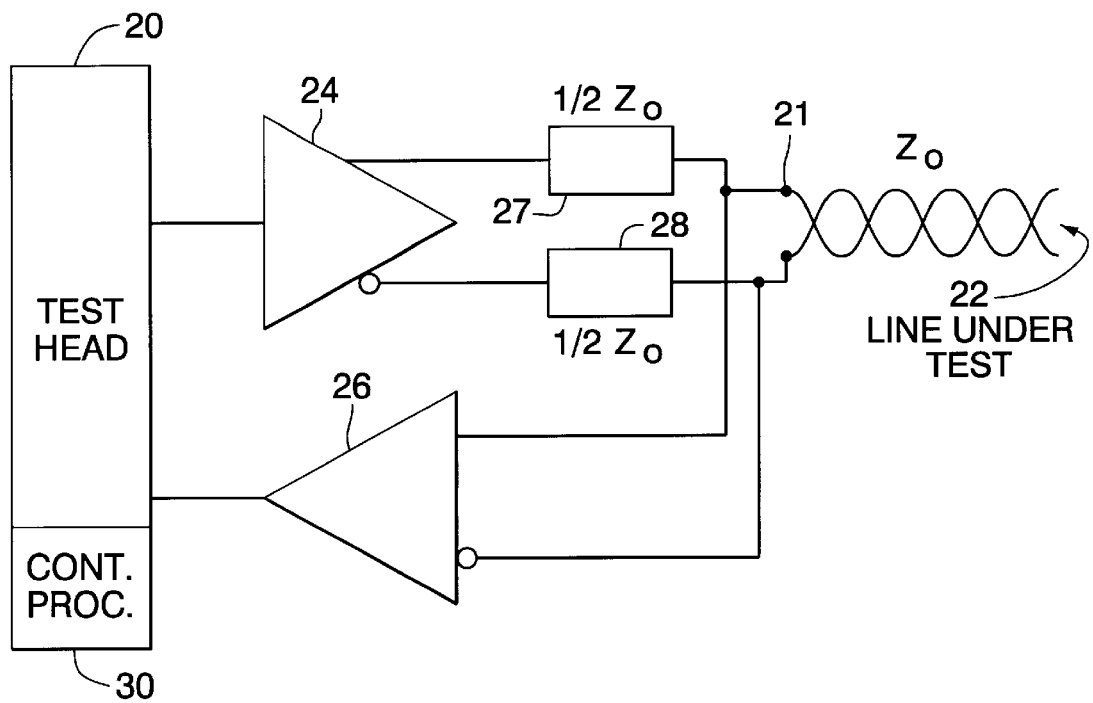
FIG. 2 diagrammatically illustrates a reduced complexity embodiment of an automated bridged tap detection arrangement in accordance with the present invention.

Attention is now directed to FIG. 2, wherein a reduced complexity embodiment of an automated bridged tap detection arrangement in accordance with the present invention is shown diagrammatically as comprising a processor-controlled test head 20, such as may be installed in a central office, or as part of test signal generation and processing circuitry of a portable craftsperson's test set. The test head circuitry 20 is adapted to be interfaced at an access location 21 with a line under test (LUT) 22 (corresponding to the metallic twisted pair 10 of FIG. 1, described above), by means of a line-driver amplifier 24 and an input/receiver amplifier 26. The line-driver amplifier 24 is coupled to access location 21 of the metallic line pair 22 through a pair of source resistors 27, 28, each of which has an impedance equal to one-half the impedance (Zo) of the line 22.

Pursuant to the invention, the test head 20 contains test signal generation and processing circuitry, that is operative to execute a frequency domain reflectometry (FDR) algorithm, through which the line 22 is stimulated to produce a response that is readily measured and analyzed to reveal where along the line reflection points are located. To this end, the test head contains a test control digital processor 30 that sources digitally created test signals in the form of a frequency-swept sinusoidal waveform. In addition, it conducts a digitally-based analysis of the line's response to the those test signals in terms of fluctuations in impedance caused by the various reflections. Since the test signals are in the form of a frequency swept analog tone, the control processor is interfaced with the line-driver and input receiver amplifiers by means of associated digital-to-analog and analog-to-digital converter circuits.

Figure 3:
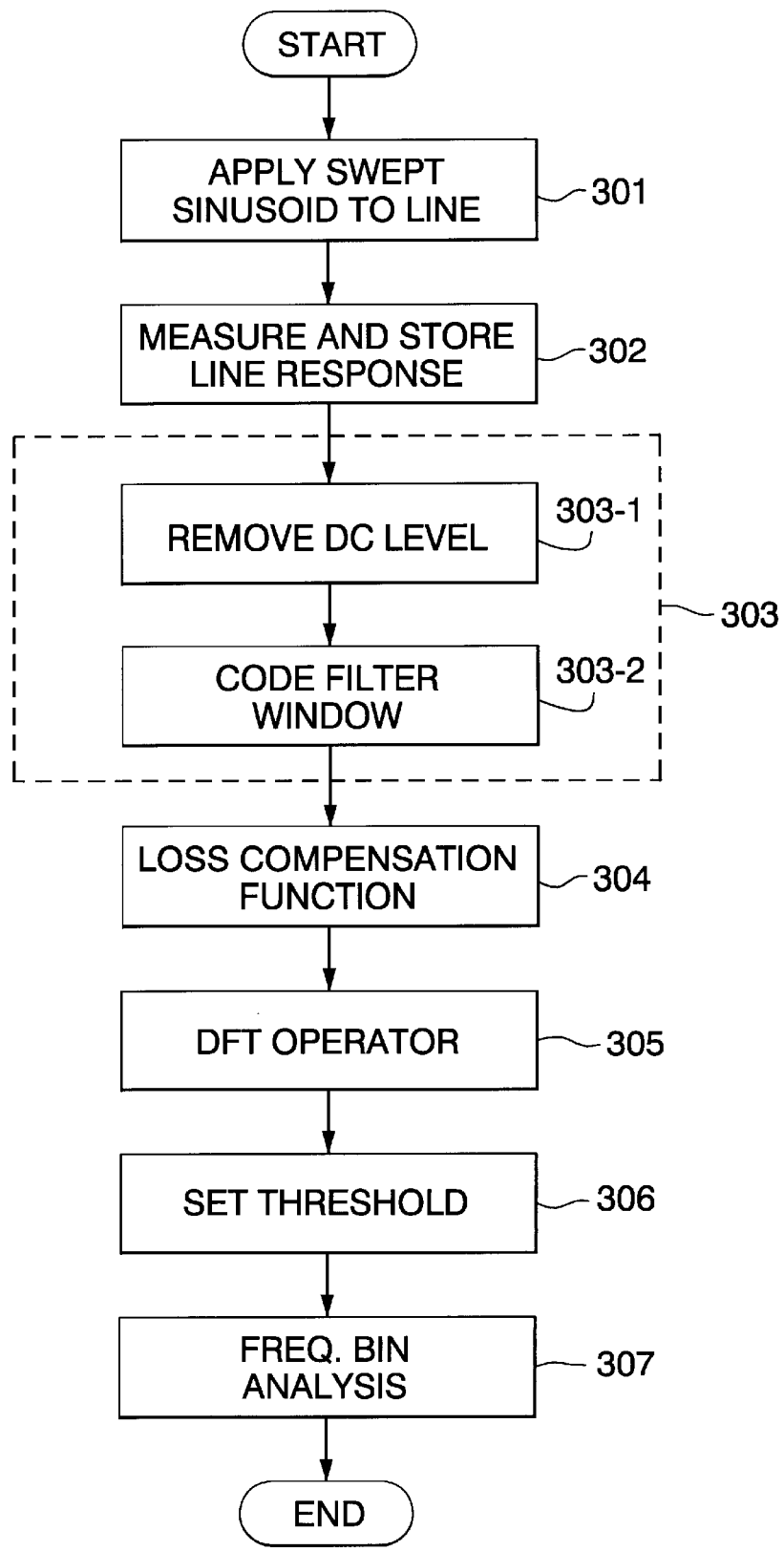
FIG. 3 is a flow chart showing the steps of the automated wireline reflection anomaly detection mechanism of the present invention.

More particularly, referring now to the overall functional sequence of the automated reflection anomaly detection mechanism of the present invention shown in the flow diagram of FIG. 3, at an initial step 301 the test head's processor generates a varying frequency sinusoidal waveform, that is converted into an analog sinusoidal tone signal and applied to the line-driver amplifier 24, which drives the line under test. In accordance with a preferred embodiment the frequency of the waveform is varied in a linear, stepwise manner, for example beginning at minimum frequency such as 0 Hz and stepping in finite incremental frequency steps up to a maximum frequency. Conversely, the frequency variation may begin at an upper frequency and proceed to a minimum frequency, without a loss in generality. As the frequency of the sinusoidal waveform is swept, the signal level at the test access point 21 is monitored via the input amplifier 26, digitized, and then and stored in a signal measurement buffer (not shown) in step 302. The amplitude of the measured signal response will exhibit a variation with frequency that is a composite of the fluctuations in impedance due to any reflection points along the LUT.

In step 303, the stored response data is modified to optimize the accuracy of the analysis. In particular, as shown at step 303-1, any DC level in the stored data is removed. Secondly, as shown at step 303-2, a code filtering (e.g., Hanning) window is applied to the data. Steps 303-1 and 303-2 serve to remove discontinuities between the start and end sample values of the captured data set, that might otherwise cause spurious results.

Next, in step 304, a loss compensation function (LCF) is applied to the adjusted data set, in order to compensate the frequency response characteristic of the line for loss over distance and frequency. In particular, the line under test can be characterized in terms of its resistance (R), inductance (L), capacitance (C), and conductance (G) parameters per unit length, which are available from tabulated industry-available sources for the type of wire. From these parameters, a frequency-dependent propagation constant T can be derived as:

$$\tau = \alpha + j\beta = ((R+jwL)(G+jwC))^{1/2}, \text{ where } w = 2\pi f.$$

The real part of the propagation constant, $\alpha(f)$, is the attenuation along the line per unit length. Since the envelope of a signal propagating along the line as a function of distance is attenuated by $e^{-\alpha(f)t}$, $\alpha(f)$ can be determined.

The effect on the frequency response waveform is that amplitude decay is less pronounced for reflected signals propagating on shorter loops, since the shorter distance offsets the effects of the loss at high frequencies, due to the effects of $\alpha(f)$. Since the actual length of the line under test is unknown, a compromise between the two extremes is employed, to provide some amount of compensation for the overall frequency response waveform for all distances of interest.

In order to determine the coefficient of the exponential attenuation function in terms of frequency, it is necessary to reduce the number of degrees of freedom of the total loss function. As the maximum frequency of the swept sinusoidal waveform is known, a priori, a loss compensation function based upon the mid frequency point of the sweep $f_{mid}=f_{max}/2$ may be employed. As will be described in detail below with reference to null vs. frequency response diagram of FIG. 4, from this mid frequency, $f_{mid}$, a corresponding resolution distance $d_{mid}$ is defined as:

$$d_{mid} = V^*/4f_{mid}$$

An 'average loss' value $\eta$ can be derived as:

$$\eta = e^{-\alpha(fmid)dmid}.$$

The loss compensation function LCF can therefore be defined as:

$$LCF = exp((-2ln(\eta)/f_{max})f).$$

The loss-compensated data is then processed in step 305 by means of a frequency analysis operator, such as discrete Fourier transform (DFT), which decomposes the composite line signal response into frequency bins associated with the individual reflectors' frequency fluctuations. In step 306, a threshold is established for the contents of the frequency bin data produced by the DFT, in order to distinguish between significant (useful) and spurious energy. The threshold employed is defined as:

Threshold (bin no.)=[(StartValue−EndValue)*exp(−bin no.*slope)]+EndValue.

The parameters StartValue, EndValue and slope are dependent upon the test head circuitry's gain and swept bandwidth, and are readily empirically determined. A frequency bin is considered to contain significant energy, if its contents exceed the threshold for that bin number. In step 307, any frequency bin whose contents exceed its threshold are subjected to waveform analysis of the type used in frequency domain reflectometry.

More particularly, for an arbitrary waveform v(t) that is the sum of two waveforms of some frequency $f_o$, a minimum will occur in v(t) at some delay $t_o$ of one waveform relative to the other. For the case of a wireline cable plant, this occurs when a waveform $v_o$ propagating downstream along the wireline is combined with a waveform $v_1$ reflected from an anomaly, such as a bridged tap and returning upstream along that wireline. In general, the combination of these two waveforms can be expressed as:

$$v(t)=v_o(t)+v_1([t-t_o])$$

$$v(t)=v_o \sin(2\pi f_o[t-t_o]).$$

Since the downstream and upstream propagating waveform components have the same frequency, v(t) will have a local minimum due to destructive interference at some time delay to when the arguments of $v_o$ and $v_1$ differ by $\pi$ radians. Namely, $$(2\pi f_o t)-(2\pi f_o[t-t_o])=\pi.$$

Dividing this expression by $2\pi f_o t$ and solving for $t_o$, yields:

$t_o=1/2f_o=T_o/2$, where the period $T_o$ of the waveform is $1/2f_o$.

Figure 4:
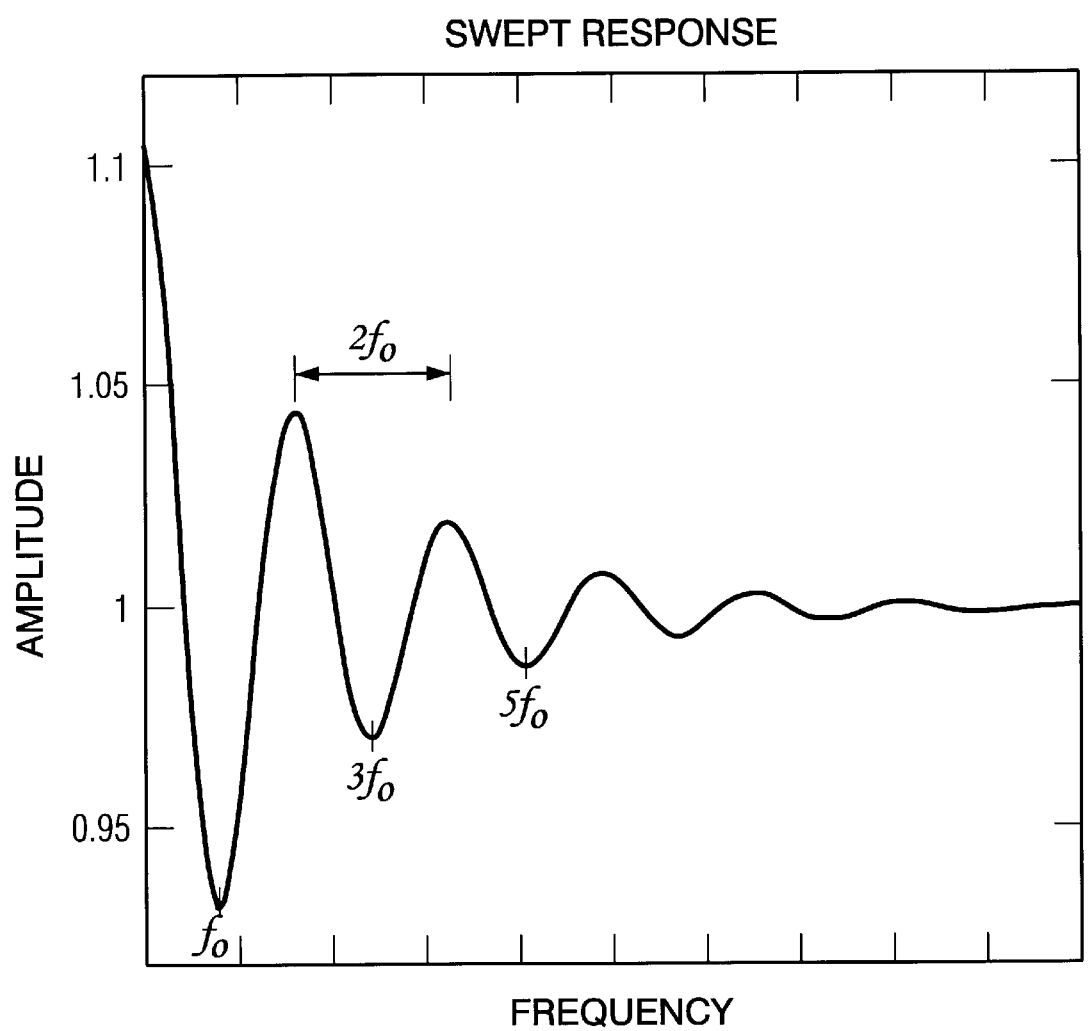
FIG. 4 is a frequency sweep response characteristic obtained in the course of executing the mechanism of FIG. 3 showing periodic nulls at frequencies $f_o$, $3f_o$, $5f_o$, $7f_o$, etc.

As shown in FIG. 4, where $t=t_o$, nulls in v(t) will occur for other frequencies $f_k$, where $f_k>f_o$, and the arguments of $v_o$ and $v_1$ differ by odd multiples of $\pi$. If k is a positive integer, the nulls will occur when:

$$(2\pi f_k t)-(2f_k[t-t_o])=2\pi f_k t_o=(2k+1)\pi.$$

Letting the period $T_k=1/f_k$, then $$2\pi f_k t_o=2\pi t_o/T_k=2\pi (T_o/2)/T_k=(2k+1)\pi.$$

$$T_o/T_k=(2k+1)$$

Substituting $T_o=1/f_o$, $T_k=1/f_k$:

$$f_k/f_o=(2k+1), \text{ or}$$

$$f_k=f_o(2k+1), \text{ for } k=0, 1, 2, \ldots$$

The periodicity of the nulls can be seen by examining the difference in frequency between two adjacent nulls $f_m$ and $f_{m+1}$. From the foregoing, $f_{m+1}-f_m=f_o(2[m+1]+1)-f_o(2m+1)=2f_o$, for m=0, 1, 2, . . .

This means that conducting a linear sweep of a wireline having a single reflection point (e.g., bridged tap) will produce nulls in the frequency response at frequencies $f_o$, $3f_o$, $5f_o$, $7f_o$, etc., as shown in FIG. 4.

Denoting $F_o$ as the repetition rate of the nulls for $t=t_o$ in the frequency domain, then:

$$F_o=1/(\text{period of the null})=1/(f_{m+1}-f_m)=1/2f_o\pi.$$

In general, the null repetition rate in the frequency domain $F_n$ is given by: $F_n=1/2f_n$, where $f_n$ is the lowest frequency at which a null occurs when the delay $t=t_n$.

From the above relationships, $F_o$ corresponds to $t_o$ and, in general $F_n$ corresponds to $t_n$, and is the same as the round-trip delay of the signal from the source or access location to the point of reflection along the line and back. In order to determine the length of time required for the waveform to propagate to the impedance-mismatch reflection point, it may be observed that $t_o$ is representative of the total time required for the downstream propagating waveform to be reflected back to the access location 21 at which the measurement is taken. This one-way delay $t_r=t_o$. To determine the distance of this reflection point from the access location, the propagation velocity $v_p$ of the waveform along the wireline must be known. In general, if $\in_r$ is the dielectric constant of the wireline insulation, c is the velocity of light in free space, and $\mu_r$ is relative permeability, then the propagation velocity in the wireline may be expressed as: $v_p=C(\in_r\mu_r)^{-1/2}$. Knowing the type of cable from industry available specifications allows the propagation velocity (typically on the order of ⅔ the velocity of light) to be readily determined.

The distance D from the access location to the location of the impedance mismatch reflection is given by the expression:

$$D=t_iv_p=v_pt_o/2=T_ov_p/4.$$

Thus D is proportional to $T_o/4$, which the one-quarter wavelength of the sinusoid waveform having a frequency $f_o$. Substituting $T_o=1/f_o$, yields $D=v_p/4f_o$. Namely, the distance D is inversely proportional to frequency. This means that the minimum resolvable distance $D_{min}=v_p/2f_{max}$.

As pointed out above, the response waveform v(t) seen at the signal measurement point will contain components produced by a plurality of reflection points as:

$$v(t)=v_o(t)+v_1(t-t_o)+v_2(t-t_1)+v_3(t-t_2)+\ldots v_n(t-t_{n-1}).$$

Since these reflected waveforms are generally associated with impedance discontinuities caused by physical characteristics in the wireline separated by varying distances from the source, the delays $t_o$, $t_1$, ... $t_{n-1}$, associated with these reflections will be mutually different, so that the values $T_o/2$, $T_1/2$, ... $T_{n-1}/2$ and thus the frequencies $f_o$, $f_1$, ... $f_{n-1}$ will be mutually different. Since $f_n$ is unique for each delay, then by identifying the various $f_n$, the two-way delay times $t_n$ of a reflection from a wireline discontinuity may be readily determined. As demonstrated above, once the time delay is known, the distance D to the impedance mismatch discontinuity (e.g., bridged tap) may be readily determined.

To determine the individual values of two-way delay time $t_n$, the frequency response waveform a(f) produced in response to stimulating the wireline under test with a linearly swept sinusoidal waveform is sampled at discrete frequency steps of ($f_{max}/N$), resulting in the sampled waveform a(k) being stored in step 302, as described above. For a radix-two buffer size of N points, the output of the DFT operation of step 305 will yield values that are proportional to the magnitudes of the various null repetition rates $F_k$. If the maximum frequency $f_{max}$ of the swept sinusoid waveform is $2f_o$, the minimum resolution of the DFT is:

$$1/f_{max}=1/2f_o=F_o=t_o \text{ (seconds)}.$$

Denoting the contents of frequency bin m as A(m) of the DFT of a(k), then the contents A(l) of the first frequency bin are the DC component of the swept response, while the bin m contains the magnitude of the null repetition rate $(m-1)F_o$, for m=2,3,4, ... N/2.

Namely, the various energy bins of the response A represent the energy in a(f) associated with the time delays $t_o$, $2t_o$, $3t_o$, etc., and A(m) contains the magnitude of the waveforms delayed by $(m-1)t_o$ for m=2,3,4, ... N/2.

Thus, the bins of A, which represent different round trip delay times of the swept waveform, can be employed to determine the distances from the access location to the energy-reflecting anomalies. The distance $D_{RP}$ to a respective reflection point RP' is readily determined by multiplying the one-way delay $t_{RP}$ by the velocity of propagation $v_p$ of the waveform.

In general the bins of the response A represent distances that are integral multiples of the delay $t_o$. Namely, $D_{m-1}=(m-1)t_ov_p/2=[(m-1)t_o]v_p/2$ for m=2,3,4, ... N/2, so that there is a one-to-one correspondence between the bins of DFT and the distances to the reflection points along the wireline.

EXAMPLE

Using the measurement arrangement diagrammatically illustrated in FIG. 2, a twisted pair wireline cable was stimulated with a sinusoidal waveform, the frequency of which was linearly varied in a stepwise manner from $f_{min}=0$ Hz to $f_{max}=2$ MHz. The source output impedance Zo was 100; namely, each source resistor 27 and 28 had an impedance of Zo/2 or fifty ohms. To accommodate a buffer size of 512 addresses, the frequency of the signal source was stepped at increments of 2 MHz/512 or 3906.25 Hz per step. At each frequency step, the line was allowed to settle and the steady state response was sampled and stored for that frequency bin. The propagation velocity $v_p$ for the cable type was 634×106 ft/sec.

For N=512, the output of the DFT for the stored response will produce 256 bins. As pointed out above, the first bin contains the DC component and is of no interest. As a non-limiting example, the threshold for the m=40th bin was exceeded, indicating the presence of significant energy in that bin. Thus, a reflection occurred after a time delay of $(m-1)/2f_{max}=(40-1)/(2\times 2000000)$ or approximately 9.75 $\mu$sec from the source location 21. Using the above expression for distance, this means that the distance from the source to the impedance discontinuity associated with energy for bin number 40 is 9.75 $\mu$sec×$v_p$=9.75×634000000/2 ft/sec=3090 ft.

As will be appreciated from the foregoing description, the shortcomings of conventional TDR-based schemes for locating energy reflecting anomalies, such as bridged taps and the like, along a wireline telecommunication link, are effectively by using frequency domain reflectometry-based mechanism of the present invention. By stimulating the line with a linearly stepped frequency sinusoidal waveform, the test head evokes a composite waveform response which, when subjected to frequency domain reflectometry analysis, yields distance data representative of locations of the energy reflection discontinuities. Service personnel may then determine what action, if any, needs to be taken relative to the located anomaly. At least knowing the location of any discontinuity allows for a more accurate determination of whether a POTS line is qualified for digital service, or requires action by a field technician to remove one or more discontinuities.

As pointed out above, the frequency bins of the response waveform represent distances that are integral multiples of delay, so that there is a one-to-one correspondence between the bins of discrete Fourier transform and distances to the reflection points along the wireline. Since the highest or maximum frequency of the stepped sweep is inversely proportional to the time resolution of the reflection points, the higher the maximum frequency, then the shorter the time resolution. In terms of distance, a higher maximum frequency facilitates resolving shorter (closer) discontinuities. Increasing the number of frequency steps enables longer propagation times to be measured, and thereby allows farther away discontinuities to be located.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of automatically identifying the position of each of at least one energy reflection location along a telecommunication wireline comprising the steps of:
   (a) generating a plurality of waveforms having respectively different frequencies;
   (b) sequentially coupling each of the respectively different frequency waveforms generated in step (a), one at the time, to a first location of said telecommunication wireline;
   (c) for each of said plurality of respectively different frequency waveforms sequentially coupled to said telecommunication wireline in step (b), measuring a variation in signal level at said first location of said telecommunication wireline; and
   (d) performing frequency domain reflectometry (FDR) processing of variations in signal level as measured in step (c) for each of said plurality of respectively different frequency waveforms to determine the distance between said first location and said position of said at least one energy reflection location along said telecommunication wireline, and compensating said variation in signal level measured in step (c) for loss through said telecommunication wireline.

2. The method according to claim 1, wherein said at least one energy reflection location comprises a plurality of energy reflection locations along said telecommunication wireline.

3. The method according to claim 1, wherein step (a) comprises linearly stepping a sinusoidal waveform between a minimum frequency and a maximum frequency, so as to generate respectively different frequency sinusoidal waveforms, and step (b) comprises sequentially coupling each of said respectively different frequency sinusoidal waveforms generated in step (a), one at the time, to said first location of said telecommunication wireline.

4. The method according to claim 3, wherein step (c) includes sampling the amplitude of the measured signal response in association with linear stepping of the frequency of said sinusoidal waveform in step (a), for each of said respectively different frequency sinusoidal waveforms sequentially coupled to said telecommunication wireline in step (b).

5. The method according to claim 4, wherein step (d) includes weighting samples of said variation in signal level measured in step (c) to excise any DC level therein and to remove discontinuities between start and end values.

6. The method according to claim 5, wherein step (d) includes applying a loss compensation function to said weighted samples so as to compensate the frequency response characteristic of said wireline for loss over distance and frequency.

7. The method according to claim 6, wherein said loss compensation function contains a frequency-dependent exponential propagation constant associated with attenuation along said telecommunication wireline per unit length.

8. The method according to claim 4, wherein step (d) includes executing a discrete Fourier transform on samples of said variation in signal level measured in step (c) to decompose the measured variation in signal level into frequency bins associated with frequency fluctuations of individual ones of said energy reflection locations.

9. The method according to claim 8, wherein step (d) comprises performing FDR processing only for those frequency bins, whose stored contents exceed thresholds that are effective to distinguish between spurious energy and significant energy associated with energy reflection locations.

10. The method according to claim 8, wherein step (d) includes deriving, from said FDR processing, output signals representative of distances from said measurement location to said locations of said energy reflection locations.

11. A system according to claim 8, wherein step (d) comprises providing a one-to-one correspondence between said frequency bins of said discrete Fourier transform and distances to said energy reflection locations.

12. A system for automatically identifying energy reflection discontinuities along a telecommunication wireline comprising a test signal generator that is operative to generate a plurality of waveforms having respectively different frequencies, and to sequentially couple each of said different frequency waveforms, one at the time, to a measurement location of said telecommunication wireline, in response to which said wireline propagates said different frequency waveforms to said energy reflection discontinuities, said energy reflection discontinuities reflecting energy back to said measurement location, a line monitoring receiver coupled to said measurement location of said telecommunication wireline, and a response processor which is operative to execute a frequency domain reflectometry (FDR) algorithm to analyze a frequency response of said telecommunication wireline to said different frequency waveforms and generates an output representative of locations of said energy reflection discontinuities; and wherein said test signal generator is operative to linearly step a sinusoidal waveform between a minimum frequency and a maximum frequency, so as to generate a plurality of sinusoidal waveforms having respectively different frequencies, and to sequentially couple each of said different frequency sinusoidal waveforms, one at the time, to said measurement location of said telecommunication wireline;

said line monitoring receiver is operative to store samples of the amplitude of the measured signal response of said telecommunication wireline in association with linear stepping of the frequency of said sinusoidal waveform;

said response processor is operative to weight said stored samples to excise any DC level therein and to remove discontinuities between start and end values; and said response processor is operative to apply a loss compensation function to said weighted samples so as to compensate the frequency response characteristic of said telecommunication wireline represented thereby for loss over distance and frequency.

13. The system according to claim 12, wherein said loss compensation function contains a frequency-dependent exponential propagation constant associated with attenuation along said telecommunication wireline per unit length.

14. The system according to claim 12, wherein said response processor is operative to execute a discrete Fourier transform which decomposes the composite line signal response received by said line monitoring receiver into frequency bins associated with frequency fluctuations of individual ones of said energy reflection discontinuities.

15. The system according to claim 14, wherein said response processor is operative to execute said FDR algorithm only for those frequency bins whose stored contents exceed thresholds that are effective to distinguish between spurious energy and significant energy associated with energy reflection discontinuities.

16. The system according to claim 14, wherein said response processor is operative to derive, from execution of said FDR algorithm, output signals representative of distances from said measurement location to said locations of said energy reflection discontinuities.

17. The system according to claim 14, wherein said response processor is operative to provide a one-to-one correspondence between said frequency bins of said discrete Fourier transform and distances to said energy reflection discontinuities along said communication wireline.

18. A method of automatically identifying the position of each of at least one energy reflection location along a telecommunication wireline comprising the steps of:

(a) generating a sinusoidal waveform having a frequency;

(b) coupling the sinusoidal waveform generated in step (a) to a measurement location of said telecommunication wireline;

(c) measuring the signal level at said measuring location of said telecommunication wireline to derive response data associated with said frequency;

(d) repeating steps (a)–(c) for each of a plurality of respectively different frequencies in addition to said frequency, so as to derive a set of response data associated with said plurality of respectively different frequencies; and (e) performing frequency domain reflectometry (FDR) processing of response data associated with said frequency and said set of response data associated with said plurality of respectively different frequencies in a manner that is effective to determine the distance between said measurement location and said position of said at least one energy reflection location along said telecommunication wireline; and wherein Step (d) includes compensating said response data associated with said frequency and said set of response data associated with said plurality of respectively different frequencies for loss through said telecommunication wireline, weighting samples of said said response data associated with said frequency and said set of response data associated with said plurality of respectively different frequencies to excise any DC level therein and to remove discontinuities between start and end values, and applying a loss compensation function to said weighted samples so as to compensate the frequency response characteristic of said wireline for loss over distance and frequency.

19. The method according to claim 18, wherein said loss compensation function contains a frequency-dependent exponential propagation constant associated with attenuation along said wireline per unit length.

20. The method according to claim 18, wherein step (d) includes executing a discrete Fourier transform on samples of said response data to decompose the measured variation in signal level into frequency bins associated with frequency fluctuations of individual ones of said energy reflection locations.

21. The method according to claim 20, wherein step (d) comprises performing FDR processing only for those frequency bins whose stored contents exceed thresholds that are effective to distinguish between spurious energy and significant energy associated with energy reflection locations.

22. The method according to claim 20, wherein step (d) includes deriving, from said FDR processing, output signals representative of distances from said measurement location to said locations of said energy reflection locations.

23. A system according to claim 20, wherein step (d) comprises providing a one-to-one correspondence between said frequency bins of said discrete Fourier transform and distances to said energy reflection locations.

* * * * *